United States Patent [19]

Sinha

[11] Patent Number: 5,437,029
[45] Date of Patent: Jul. 25, 1995

[54] PATH NAME RESOLUTION METHOD PROVIDING FIXED SPEED OF FILE ACCESSING IN COMPUTER NETWORK

[75] Inventor: Pradeep K. Sinha, Kawasaki, Japan

[73] Assignee: Matsushita Electric Industrial Co., Ltd., Osaka, Japan

[21] Appl. No.: 220,424

[22] Filed: Mar. 30, 1994

[30] Foreign Application Priority Data

Mar. 31, 1993 [JP] Japan .................... 5-073209

[51] Int. Cl.⁶ .................. G06F 15/16; G06F 17/30
[52] U.S. Cl. .................. 395/600; 395/200; 395/800; 364/282.4; 364/284.4; 364/974.7; 364/DIG. 1; 364/DIG. 2
[58] Field of Search .................. 395/600, 200, 800

[56] References Cited

U.S. PATENT DOCUMENTS

| | | | |
|---|---|---|---|
| 4,718,005 | 1/1988 | Feigenbaum et al. | 395/200 |
| 5,151,989 | 9/1992 | Johnson et al. | 395/600 |
| 5,287,537 | 2/1994 | Newmark et al. | 395/800 |
| 5,357,630 | 10/1994 | Oprescu et al. | 395/600 |
| 5,377,323 | 12/1994 | Vasudevan | 395/200 |

FOREIGN PATENT DOCUMENTS 3103942 4/1991 Japan.

OTHER PUBLICATIONS

Deitz et al., "CRegs: A New Kind of Memory For Referencing Arrays and Pointers", Proceedings. Supercomputing '88, Orlando, Fla., 14–18 Nov. 1988, pp. 360–367.

Gopal et al., "Analysis of a Class of Distributed Directory Algorithms", IEEE INFOCOM '89. The Conference on Computer Communications. Proceedings of the Eighth Annual Joint Conference of the IEEE Computer and Communications Societies. Ottawa, Canada, 23–27 Apr. 1989, pp. 293–302.

Primary Examiner—Thomas G. Black
Assistant Examiner—Paul R. Lintz
Attorney, Agent, or Firm—Lowe, Price, LeBlanc & Becker

[57] ABSTRACT

A method of path name resolution is provided for use in a network of data processing systems, whereby each user of a system can specify that a particular file, located at some other system in the network, is to be accessed using a local search mode of path name resolution, providing high access performance with fixed access speed. Each of the directories of the path name of that file which are resident in other systems of the network are then replicated on disk at the user's system, each replicated directory including a counter which is initialized to 1. Each subsequent request by a user of that system for applying the local accessing mode to the same path name results in each of the counters being incremented by 1, while each request for returning the resolution mode to the conventional network-accessing mode of path name resolution results in each of the counters being decremented by 1, with a replicated directory being deleted when its counter value reaches zero.

3 Claims, 17 Drawing Sheets

| PATH NAME | OBJECT LOCATION INFORMATION | |
|---|---|---|
| /a/b/c | 4 | ~95 |
| | | ~96 |
| ⋮ | ⋮ | |

| PATH NAME | OBJECT LOCATION INFORMATION | REFERENCE COUNTER | |
|---|---|---|---|
| ↗103 | ↗104 | ↗105 | |
| | | | ~100 |
| | | | ~101 |
| ⋮ | ⋮ | ⋮ | |

FIG. 3

| PATH NAME | OBJECT LOCATION INFORMATION | |
|---|---|---|
| /a/b/c | 4 | ~95 |
|  |  | ~96 |
| ⋮ | ⋮ | |

FIG. 4A

| PATH NAME (103) | OBJECT LOCATION INFORMATION (104) | REFERENCE COUNTER (105) | |
|---|---|---|---|
|  |  |  | ~100 |
|  |  |  | ~101 |
| ⋮ | ⋮ | ⋮ | |

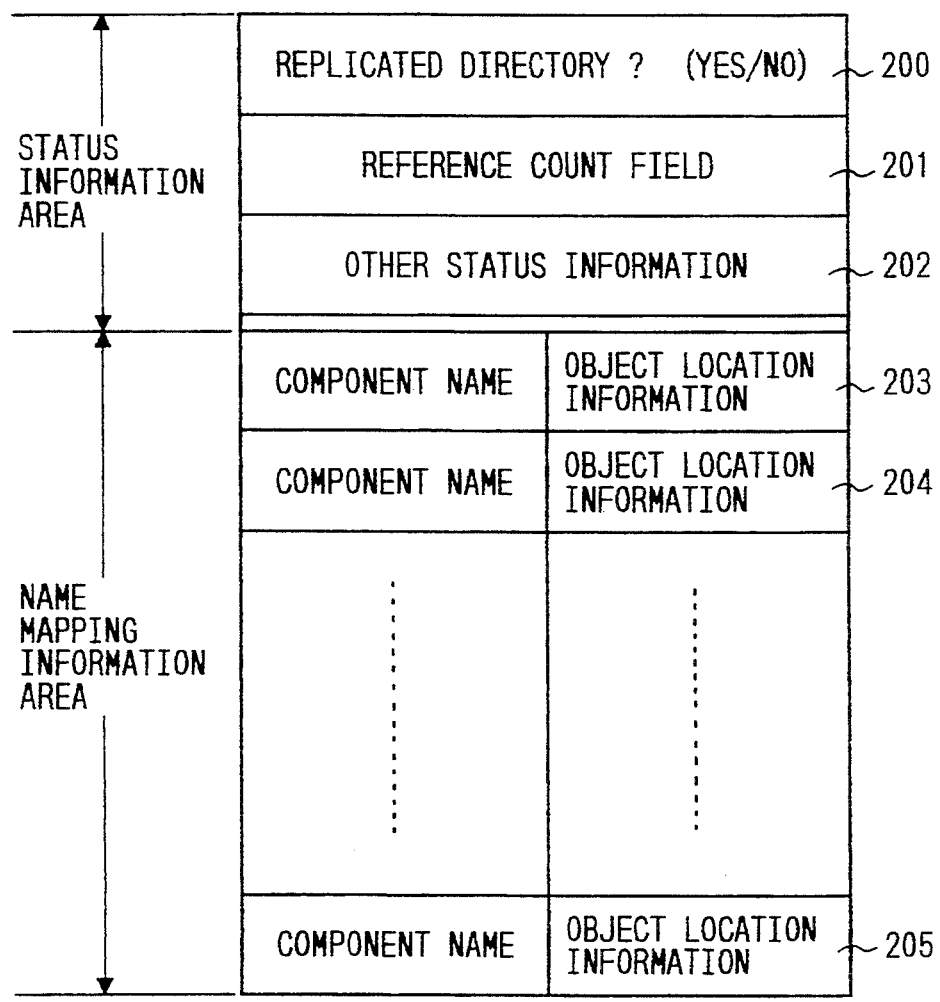

FIG. 11A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | | | NO | | | |
| | REFERENCE COUNTER | | | | / | | |
| /a/b | REPLICATED DIRECTORY ? | | | | | NO | |
| | REFERENCE COUNTER | | | | | / | |
| /a/b/c | REPLICATED DIRECTORY ? | | NO | | | | |
| | REFERENCE COUNTER | | | / | | | |
| /a/b/c/d | REPLICATED DIRECTORY ? | | | | NO | | |
| | REFERENCE COUNTER | | | | / | | |

FIG. 11B

| PATH NAME | OBJECT LOCATION | REFERENCE COUNTER |
|---|---|---|
| | | |
| | | |

FIG. 12A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | | | | NO | | |
| | REFERENCE COUNTER | | | | / | | |
| /a/b | REPLICATED DIRECTORY ? | | | | | NO | |
| | REFERENCE COUNTER | | | | | | / |
| /a/b/c | REPLICATED DIRECTORY ? | | | NO | | | |
| | REFERENCE COUNTER | | / | | | | |
| /a/b/c/d | REPLICATED DIRECTORY ? | | | | | NO | |
| | REFERENCE COUNTER | | | | / | | |

FIG. 12B

| PATH NAME | OBJECT LOCATION | REFERENCE COUNTER |
|---|---|---|
| /a/b/c/d/e | NODE 6 | 1 |
| | | |

FIG. 13A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | | | | | | |
| /a | REPLICATED DIRECTORY ? | YES | | NO | | | |
| | REFERENCE COUNTER | 1 | | | | | |
| /a/b | REPLICATED DIRECTORY ? | YES | | | | NO | |
| | REFERENCE COUNTER | 1 | | | | | |
| /a/b/c | REPLICATED DIRECTORY ? | YES | NO | | | | |
| | REFERENCE COUNTER | 1 | | | | | |
| /a/b/c/d | REPLICATED DIRECTORY ? | YES | | | NO | | |
| | REFERENCE COUNTER | 1 | | | | | |

FIG. 13B

| PATH NAME | OBJECT LOCATION | REFERENCE COUNTER |
|---|---|---|
| /a/b/c/d/e | NODE 6 | 1 |
| | | |

FIG. 14A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | YES | | NO | | | |
| | REFERENCE COUNTER | 1 | | / | | | |
| /a/b | REPLICATED DIRECTORY ? | YES | | | | NO | |
| | REFERENCE COUNTER | 1 | | | | / | |
| /a/b/c | REPLICATED DIRECTORY ? | YES | NO | | | | |
| | REFERENCE COUNTER | 1 | / | | | | |
| /a/b/c/d | REPLICATED DIRECTORY ? | YES | | | NO | | |
| | REFERENCE COUNTER | 1 | | | / | | |

FIG. 14B

| PATH NAME | OBJECT LOCATION | REFERENCE COUNTER |
|---|---|---|
| /a/b/c/d/e | NODE 6 | 2 |
| | | |

FIG. 15A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | YES | | NO | | | |
| | REFERENCE COUNTER | 2 | | / | | | |
| /a/b | REPLICATED DIRECTORY ? | YES | | | | NO | |
| | REFERENCE COUNTER | 2 | | | | / | |
| /a/b/c | REPLICATED DIRECTORY ? | YES | NO | | | | |
| | REFERENCE COUNTER | 2 | / | | | | |
| /a/b/c/d | REPLICATED DIRECTORY ? | YES | | | NO | | |
| | REFERENCE COUNTER | 2 | | | / | | |

FIG. 15B

| PATH NAME | OBJECT LOCATION | REFERENCE COUNTER |
|---|---|---|
| /a/b/c/d/e | NODE 6 | 2 |
| | | |

FIG. 16A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | YES | | | NO | | |
| | REFERENCE COUNTER | 1 | | | / | | |
| /a/b | REPLICATED DIRECTORY ? | YES | | | | NO | |
| | REFERENCE COUNTER | 1 | | | | / | |
| /a/b/c | REPLICATED DIRECTORY ? | YES | NO | | | | |
| | REFERENCE COUNTER | 1 | / | | | | |
| /a/b/c/d | REPLICATED DIRECTORY ? | YES | | | NO | | |
| | REFERENCE COUNTER | 1 | | | / | | |

FIG. 16B

| PATH NAME | OBJECT LOCATION | REFERENCE COUNTER |
|---|---|---|
| /a/b/c/d/e | NODE 6 | 2 |
| | | |

FIG. 17A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | | | | NO | | |
| | REFERENCE COUNTER | | | | / | | |
| /a/b | REPLICATED DIRECTORY ? | | | | | NO | |
| | REFERENCE COUNTER | | | | | / | |
| /a/b/c | REPLICATED DIRECTORY ? | | | NO | | | |
| | REFERENCE COUNTER | | | / | | | |
| /a/b/c/d | REPLICATED DIRECTORY ? | | | | NO | | |
| | REFERENCE COUNTER | | | | / | | |

FIG. 17B

| PATH NAME | OBJECT LOCATION | REFERENCE COUNTER |
|---|---|---|
| /a/b/c/d/e | NODE 6 | 2 |
| | | |

FIG. 18A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | | | NO | | | |
| | REFERENCE COUNTER | | | / | | | |
| /a/b | REPLICATED DIRECTORY ? | | | | | NO | |
| | REFERENCE COUNTER | | | | | / | |
| /a/b/c | REPLICATED DIRECTORY ? | | NO | | | | |
| | REFERENCE COUNTER | | / | | | | |
| /a/b/c/d | REPLICATED DIRECTORY ? | | | | NO | | |
| | REFERENCE COUNTER | | | | / | | |

FIG. 18B

| PATH NAME | OBJECT LOCATION | REFERENCE COUNTER |
|---|---|---|
| /a/b/c/d/e | NODE 6 | 1 |
| | | |

FIG. 19A

| DIRECTORY | | NODE 1 | NODE 2 | NODE 3 | NODE 4 | NODE 5 | NODE 6 |
|---|---|---|---|---|---|---|---|
| / | REPLICATED DIRECTORY ? | NO | | | | | |
| | REFERENCE COUNTER | / | | | | | |
| /a | REPLICATED DIRECTORY ? | | | NO | | | |
| | REFERENCE COUNTER | | | | / | | |
| /a/b | REPLICATED DIRECTORY ? | | | | | NO | |
| | REFERENCE COUNTER | | | | | | / |
| /a/b/c | REPLICATED DIRECTORY ? | | NO | | | | |
| | REFERENCE COUNTER | | | / | | | |
| /a/b/c/d | REPLICATED DIRECTORY ? | | | | NO | | |
| | REFERENCE COUNTER | | | | | / | |

FIG. 19B

| PATH NAME | OBJECT LOCATION | REFERENCE COUNTER |
|---|---|---|
| | | |
| | | |

PATH NAME RESOLUTION METHOD PROVIDING FIXED SPEED OF FILE ACCESSING IN COMPUTER NETWORK

BACKGROUND OF THE INVENTION

1. Field of the Invention

The present invention relates to a method of path name resolution for use in a distributed system formed of a plurality of data processing systems interconnected by a network.

2. Description of the Prior Art

In recent years, in the area of data processing, there has been considerable development of distributed systems. A distributed system basically consists of a number of data processing systems, referred to in the following for brevity of description as nodes, which are interconnected to form a network. Each node basically consists of a processor together with a main memory (i.e. random access memory formed of semiconductors) having high access speed and limited storage capacity, and a secondary memory (such as a magnetic "hard disk") having relatively slow access speed and high storage capacity. In the following, the secondary memory will be referred to as the "disk" of a node.

With such a distributed system, files and directories are distributed throughout the network i.e. are stored on disk at various nodes of the network. Thus it will frequently happen that a file for which access is required by the user of one node of the system (the "client" node) is resident at some other node (the "server" node). In that case it is necessary for the client node to execute communication via the network, to access the file in the server node.

The directories serve to map respective files (or other directories, i.e. subdirectories) to information to be used in locating the files or subdirectories. That is to say, if a file is not named in the root directory of the directory system, but in a subdirectory which may be a "child", "grandchild", etc. descendant from the root directory, then in order to access that file it is necessary to specify the particular subdirectory in which the file is listed as a component name. That is done by entering a path name for the file, which sequentially lists the directories which must be successively searched in order to finally obtain location information for the desired file.

The procedure executed by the system to obtain the required file location information, by using such a path name, is referred to as path name resolution. In the case of a distributed system, problems arise due to the fact that directories, as well as files, are distributed throughout the nodes of the system, rather than being all resident at a single data processing system.

That point will be described referring to FIGS. 1 and 2. In FIG. 1, which represents a part of a distributed system, three nodes of the system, designated by numerals 80, 81 and 82 are will be referred to as nodes 1, 2 and 3 respectively. Numeral 83 designates a file, having the file name "c", which is stored on the disk of node 3. It will be assumed that a user of node 1 requires to access the file c. The path name which the user must input to node 1 in order to access the file c is "/a/b/c". This signifies that to obtain the desired location information for file c, the root directory (generally designated by "/") must be searched to find the component name "a", to obtain location information for a subdirectory /a. That subdirectory must then be searched for a component name "b", to obtain location information for a subdirectory /a/b. The subdirectory /a/b must then be searched for a component name "c", to obtain location information for the desired file. That process of path name resolution is illustrated in FIG. 2, in which it is assumed that the root directory is stored at node 1, the directory /a at node 2, and the subdirectory /a/b at node 3, these directories being respectively designated by numerals 90, 91 and 92. For simplicity, the necessary location information for the directories /a, /a/b, and file c are respectively indicated as "2", "3" and "4".

After obtaining the location information for subdirectory /a by searching the root directory, a netowork access must be performed (as indicated by numeral 90) before searching the subdirectory /a to obtain location information for the subdirectory /a/b. Another network access 93 must then be performed, before searching for location information for the desired file c can be completed. It has thus been necessary to execute two network accesses in order to achieve path name resolution, in this simple example. In practice, the number of network accesses required to execute path name resolution could be substantially greater.

As a result, system performance is degraded, due to the network being frequently accessed for the purpose of path name resolution. In addition, if any of the intermediate nodes which must be accessed to perform path name resolution is temporarily inoperative, then path name resolution cannot be achieved. Thus, overall system reliability is reduced.

Each directory consists of a list of component names, which are mapped to location information for the corresponding components (directories or files). Since each directory is identified by a name, in the same way as for a file, directories can be accessed in the same way as files. The term "resident directory" of a node as used herein signifies an original directory of the node, having, as component names of entries, names of files which are currently recorded on disk at that node, as well as names of subdirectories, i.e. "descendant" directories of itself. These subdirectories may be resident at that node, or may be resident at other nodes of the system. The resident directories of a node consist of at least a root directory (to be distinguished from the term "root directory of a path name" as used herein for the first directory of a path name) and may also include one or more of the aforementioned resident subdirectories.

A resident directory of one node may also be replicated on disk at some other node, since it may be convenient to be able to locally search such a replicated directory at the other node.

Various proposals have been made in the prior art for reducing the number of network accesses which are necessary to achieve path name resolution in a distributed system. One method is to use a name cache (sometimes called a directory cache), at each node, i.e. a table which is set up within a region of the main memory of a node, which relates various frequently-utilized path names to the locations of the corresponding files within the distributed system. By using such a name cache, it becomes unnecessary to execute the multiple network access described above in order to achieve path name resolution, so that the system performance can be substantially improved. The structure of such a name cache is illustrated in FIG. 3. As shown, this consists of a set of entries 95, 96, etc., each relating a path name to object location information which specifies the location within the distributed system of a file which is specified by the path name. Such object location information will basically consist of information to indicate the node at which the file is stored, and information for locating the file at that node. The first time that path name resolution is executed for a file, it is performed by the conventional node-by-node directory access method described hereinabove referring to FIG. 1. When the location information for the desired file within the distributed system has thus been obtained, it is written into an entry of the name cache, in conjunction with the corresponding path name, as shown in FIG. 3. Thereafter, when a user wishes to access that file, it is only necessary for the system to read out from the name cache the file location information which corresponds to the path name for the file, whereupon the node at which the file is stored can immediately be directly accessed via the network, and the file located at that node, without the need to access any intermediate nodes.

However since the amount of main memory available at each node is limited, the size of the memory region available for such a name cache must be small. Hence, when the maximum number of entries of the name cache is exceeded, it becomes necessary to perform replacement processing at each node, thereby deleting one or more entries to make room for new entries. Various types of replacement algorithms have been proposed for that purpose, however such methods have the basic disadvantage that the system users are not aware of the current contents of the name cache. Hence it is impossible for a user to forecast the amount of time which will be required to access any specific file within the distributed system, since there may be a very large difference between the access time for a file when the name cache is utilized and the access time for that file when the node-by-node method of path name resolution shown in FIG. 2 is applied. Due to that fact, it is difficult to use a name cache in a real-time processing system.

SUMMARY OF THE INVENTION

It is an objective of the present invention to overcome the problems of the prior art described above, by providing a method of path name resolution for a distributed system, whereby each user of a node of the system can specify a mode of path name resolution for use in accessing any specific file from that node, which results in a short, fixed value of access time being established for that file, and whereby any change of the mode of path name resolution from the mode specified by that user is effected by a command supplied by the user, rather than being performed by some automatic processing operation executed by the system.

It is a further objective of the present invention to provide a method of path name resolution for a distributed system, whereby each user of a node of the system can selectively specify either a first mode of path name resolution for use in accessing a specific file from that node, which results in a fixed, minimum access time for that file and utilizes a name cache within the main memory of that node, or a second mode of path name resolution for use in accessing the file, which results in a fixed relatively short (fixed) access time for that file and which utilizes replicated directories which are stored on disk at the node, and whereby any change of the mode of path name resolution from the mode specified by that user is effected by the user.

Specifically, to achieve the above objectives, according to a first aspect the present invention provides a path name resolution method applicable to a network of data processing systems, each of the data processing systems having main memory means with high access speed and secondary memory means with lower access speed than the main memory means, the method comprising:

at a first system of the data processing systems, responding to inputting of a first predetermined command which specifies a path name of a file that is resident at a second system of the data processing systems and which specifies a high-speed mode of path name resolution for the path name, by accessing and searching each of successive directories which are identified in the path name, to obtain file location information for the file, and creating an entry in a cache within the main memory means, the cache entry comprising a name of the file, the file location information, and a counter which is initialized to a fixed amount;

responding to a subsequent inputting of the first predetermined command specifying the path name, by incrementing the counter by said fixed amount;

responding to inputting of a second predetermined command which specifies the path name and which specifies a mode of resolving the path name which does not utilize the cache, by decrementing the counter value by said fixed amount; and responding to a condition whereby the counter value becomes zero, by deleting the cache entry.

According to a second aspect, the invention provides a path name resolution method applicable to such a network of data processing systems, the method comprising:

at a first system of the data processing systems, responding to inputting of a first predetermined command which specifies a path name of a file that is resident at a second system of the data processing systems and which specifies a moderate-speed mode of resolution of the path name, by replicating in the secondary memory means of the first system, as a replicated directory, each of a set of directories which are identified in the path name and are not original directories of the first system;

providing, in each of the replicated directories, a counter which is initialized to a fixed amount;

responding to a subsequent inputting of the first predetermined command specifying the path name, by incrementing each of the counters by said fixed amount;

responding to inputting of a second predetermined command which specifies the path name and which specifies a mode of resolving the path name other than the moderate-speed mode, by decrementing each of the counter values by said fixed amount; and responding to a condition whereby any of the counter values becomes zero, by deleting a corresponding one of the replicated directories.

According to a third aspect, the invention provides a path name resolution method for such a network of data processing systems, whereby the method comprises:

at a first system of the data processing systems, responding to inputting of a first predetermined command which specifies a first path name, of a file that is resident at a second system of the data processing systems, and which specifies a high-speed mode of resolution for the first path name, by accessing and searching each of successive directories which are identified in the first path name, to obtain file location information for the file, and creating an entry in a cache within the main memory means, the cache entry comprising a name of the file, the file location information, and a first counter which is initialized to a fixed amount;

responding to a subsequent inputting of the first predetermined command specifying the first path name, by incrementing the first counter by said fixed amount;

responding to inputting of a second predetermined command which specifies the first path name and which specifies a mode of resolving the first path name other than the high-speed mode, by decrementing the first counter value by said fixed amount; and responding to a condition whereby the first counter value becomes zero, by deleting the cache entry;

responding to inputting of a third predetermined command which specifies a second path name, of a file that is resident at one of the data processing systems other than the first system, and which specifies a moderate-speed mode of path name resolution for the path name, by replicating in the secondary memory means of the first system, as respective replicated directories, a set of directories which are identified in the second path name and which are not original directories of the first system;

providing in each of the replicated directories a second counter, which is initialized to said fixed amount;

responding to a subsequent inputting of the third predetermined command specifying the second path name, by incrementing each of the second counters by said fixed amount;

responding to inputting of a fourth predetermined command which specifies the second path name and which specifies a mode of resolving the second path name other than the moderate-speed mode, by decrementing each of the second counter values by said fixed amount; and responding to a condition whereby any of the second counter values becomes zero, by deleting a corresponding one of the replicated directories.

By applying a path name resolution method according to the invention, each user of a distributed system is enabled to specify, for any desired files, that the locations of the files will be resolved with a fixed speed of accessing, irrespective of the locations in the distributed system of directories which must be successively searched in order to obtain location information for each file. This is achieved by executing local resolution of of path names for these files, using either replicated directories or using a special type of name cache. Each entry in the name cache, and each of the replicated directories, is provided with a counter, which is incremented or decremented in accordance with successive users specifying or cancelling a requirement that name path resolution be performed using that cache entry, or using that replicated directory, with each cache entry or replicated directory being deleted when its counter reaches zero. Hence, it becomes unnecessary for the system to execute processing for automatic deletion/replacement of name cache entries or replicated directories in order to prevent storage space limitations from being exceeded. In addition, each user can make certain, for any desired file, that a fixed high speed of file accessing is ensured, which will not be arbitrarily changed by the system.

BRIEF DESCRIPTION OF THE DRAWINGS

FIG. 3 conceptually illustrates the configuration of a prior art type of name cache;

FIG. 4A conceptually illustrates the configuration of a SNPT cache utilized with an preferred embodiment of the present invention;

FIG. 4B illustrates an example of the configuration of an object location field in the each entry of the SNPT cache of FIG. 4A;

FIG. 5 illustrates the configuration of each directory of a distributed system, for use with the preferred embodiment of the present invention;

FIGS. 11A, 11B illustrate respective initial statuses of directories and a SPNT cache in a distributed system, for an example of application of the preferred embodiment of the invention;

FIGS. 12A, 12B illustrate the effects, on the directory and cache statuses of the example of FIGS. 11A, 11B, of inputting an interface command designating that Type 1 path name resolution is to be executed for a specific file;

FIGS. 13A, 13B illustrate the effects, on the directory and cache statuses of the example of FIGS. 12A, 12B, of inputting an interface command designating that Type 2 path name resolution is to be executed for a specific file;

FIGS. 14A, 14B illustrate the effects, on the directory and cache statuses of the example of FIGS. 13A, 13B, of inputting a second interface command designating that Type 1 path name resolution is to be executed for the same file;

FIGS. 15A, 15B illustrate the effects, on the directory and cache statuses of the example of FIGS. 14A, 14B, of inputting a second interface command designating that Type 2 path name resolution is to be executed for the same file;

FIGS. 16A, 16B illustrate the effects, on the directory and cache statuses of the example of FIGS. 15A, 15B, of inputting an interface command designating a change to Type 3 path name resolution, for a file for which Type 2 resolution had been previously set;

FIGS. 17A, 17B illustrate the effects, on the directory and cache statuses of the example of FIGS. 16A, 16B, of inputting a second interface command designating a change to Type 3 path name resolution, for the file for which Type 2 resolution had been previously set;

FIGS. 18A, 18B illustrate the effects, on the directory and cache statuses of the example of FIGS. 17A, 17B, of inputting an interface command designating a change to Type 3 path name resolution, for a file for which Type 1 resolution had been previously set; and FIGS. 19A, 19B illustrate the effects, on the directory and cache statuses of the example of FIGS. 18A, 18B, of inputting a second interface command designating a change to Type 3 path name resolution, for the file for which Type 1 resolution had been previously set.

DESCRIPTION OF PREFERRED EMBODIMENTS

Figure 1:
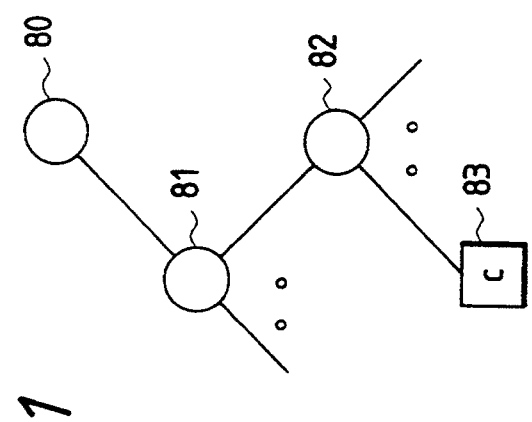
FIG. 1 is a conceptual diagram showing a simple example of a distributed system in which directories and files are distributed throughout a network of processors.

A preferred embodiment of the path length resolution method of the present invention will be described in the following. It is a basic feature of the embodiment that each user of a distributed system is enabled to select one out of three different modes of path name resolution when accessing a file, i.e.:

(a) A first mode of operation (referred to in the following as Type 1 operation), to be selected when a very high speed of file access is required (for example if the file is used very frequently by that user, or the file will be accessed during real-time processing in which it is desirable that a fixedly predetermined high access speed will be achieved), (b) A second mode of operation (referred to in the following as Type 2 operation), to be selected when an intermediate speed of file access is required (for example if the file is used moderately frequently by the user); and (c) A third mode of operation, which is the conventional node-by-node path name resolution mode described hereinabove referring to FIGS. 1 and 2 and which will be referred to herein as Type 3 operation. This would be selected by the user when accessing a file which he/she would expect to access infrequently.

When Type 1 operation is specified to the system by a user of a client node, e.g. to access a file which the user expects to access frequently, then the first access to the required file (i.e. the first access initiated after a command requesting Type 1 operation has been supplied by the user to the system) is executed using the conventional method of path name resolution. The location information that is thereby obtained for the file is then set into an entry in a special type of name cache within the main memory of the client node, in correspondence with the path name of the file. Such a name cache will be referred to in the following as a SPNT (super performance name table) cache, and has the configuration shown in FIG. 4. As shown, this is in the form of a table having entries 100, 101, etc., for respective path names, with each entry having a path name field 101, an object location field 102, and a reference counter field 103. The object location field contains information that specifies the location of the corresponding object (in general, a file). That information will basically consist of the node identifier for the node where the object is resident, and information to be used in locating the object at that node. Thus the format of the object location field could be as shown in FIG. 4B.

It can thus be understood that such an SPNT cache differs from a prior art name cache used for path name resolution, in being provided with a reference counter field for each entry.

The reference counter is initialized to a value of 1 when the entry is first set up in the SPNT cache. Thereafter, whenever a user initiates an access to the object (e.g. file) specified by the path name, path name resolution will be executed by reading out the location information for the file from the SPNT cache, so that maximum speed of accessing is achieved. However, if a user (i.e. who previously specified Type 1 operation for that file) subsequently decides that the file in question will no longer be frequently accessed by him/her, then the user initiates an access specifying Type 3 or a Type 1 operation. When that is done, the reference counter of that entry in the SPNT cache is reset to zero, and the entry is deleted from the SPNT cache. However, if after the reference counter has been initialized to 1, some other user also initiates an access to the same file, specifying Type 1 operation for path name resolution, then the reference counter will be incremented to 2. In that case, it would be necessary for two commands to be successively supplied to the system, specifying that path name resolution by a mode other than Type 1 is to be performed for the file in question, before the corresponding entry will be deleted from the SPNT cache.

It can thus be understood that with such a method, each user of the distributed system can specify, for accessing any particular file, whether or not maximum accessing speed (using the SPNT cache) will be required, whenever the file is accessed in future. Furthermore, if the user subsequently finds that a file which had been frequently utilized will no longer be utilized (or only rarely used), then the user can notify the system of that fact, by executing an access to the file while specifying a path name resolution mode which does not utilize the SPNT cache. The reference counter value for the corresponding file entry within the SPNT cache is thereby decremented. If a sufficient number of users do this in succession, then the entry will be eventually deleted from the SPNT cache.

Hence, with such a method:

(a) It is unnecessary for the system to execute any type of automatic entry replacement processing for the SPNT cache, to prevent the maximum number of entries of the cache from being exceeded, since when a file ceases to be frequently accessed, the corresponding entry will be deleted from the SPNT cache; and (b) Each user of the system can specify a high access speed, with predictable access time, for accessing any specific file. Hence, the problem of uncertainty concerning access times which arises with prior art types of path name resolution using a name cache is overcome, and the operation becomes applicable to real-time processing.

(c) Each user can be certain that, once he/she has specified Type 1 resolution for a particular file, ensuring a fixed high speed of file access, that mode of path name resolution will be left unchanged thereafter, until the user specifies that it is to be changed.

Since the SPNT cache contents are used only by the system, the file location information will typically be system-oriented. FIG. 4B shows an example of how the file location field might be configured, as a combination of a first field (field 1) containing a node identifier, which specifies the node where the file is stored, i.e. the server node, and a second field (field 2) containing local file identifier information, which will be used by the server node to locate the file.

When a user initiates a file access, specifying Type 2 operation, then that access to the required file is executed using the conventional (i.e. Type 3) method of path name resolution. In this case however, each of the directories through which the name path passes in the course of path name resolution is replicated at the client node, i.e. is recorded on disk at the client node. Thereafter, when a user of that client node again accesses the file in question by inputting the path name of the file (i.e. without specifying the mode of path name resolution), path name resolution will be executed locally at the client node, by successively reading out the various replicated directories from disk, to trace the path through the directories to obtain location information for the desired file (i.e. information specifying the node where the file is stored, and the location where the file resides at that node). The file can then be directly accessed, via the network system.

It can be understood that in this case, the process of path name resolution is executed in essentially the same manner as with the conventional (Type 3) method of sequentially searching each of the directories which are components of the path name. However with Type 2 operation, such sequential searching is performed by accessing directories which are stored on the disk of the client node, i.e. all path name resolution is executed locally. Hence, a fixed speed of accessing, with high reliability, is achieved.

Figure 2:
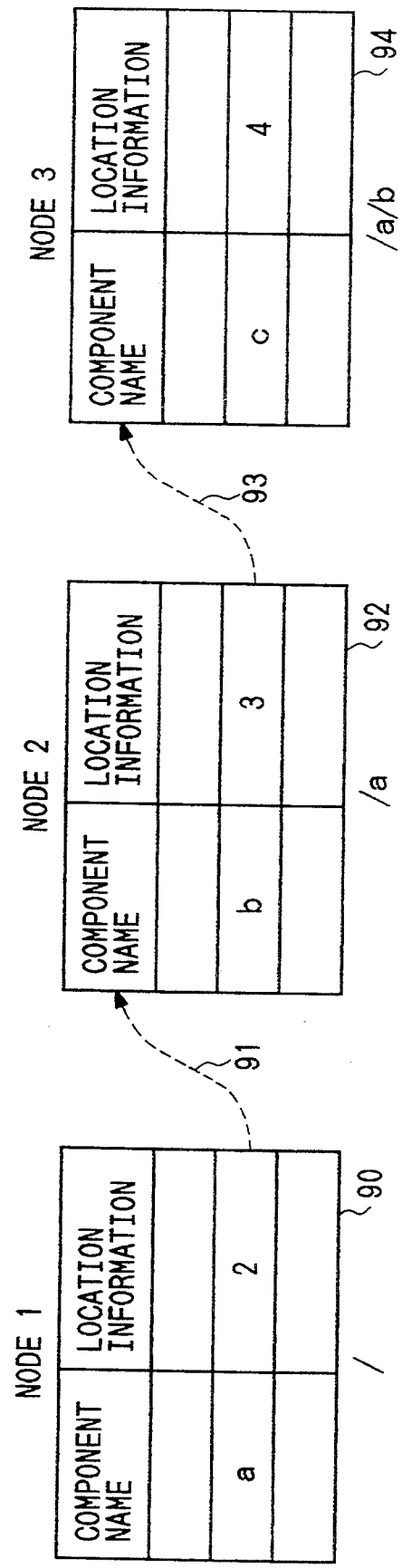
FIG. 2 is a conceptual diagram for illustrating the process of path name resolution.

For example taking the case of the path name '/a/b/c' for the file c of FIGS. 1 and 2 described above, if a user of node 1 specifies that file c is to be accessed using Type 2 operation, and the file is then accessed by the conventional node-by-node directory accessing method, each of the directories /a and /a/b of the nodes 2 and 3 of the distributed system will be recorded on disk at the node 1 (where the root directory of the path name is already stored). The next time that file c is accessed from that node, the system will execute path name resolution by the successive steps of:

(a) accessing the root directory from the local disk, thereby obtaining location information for the subdirectory /a;

(b) accessing the subdirectory /a from the local disk, thereby obtaining location information for the subdirectory name /a/b;

(c) accessing the subdirectory /a/b from the local disk, thereby obtaining the desired location information for the file c, i.e. information indicating that the file c is stored at node 3, in conjunction with information for locating the file c at that node.

It can thus be understood that path name resolution is executed in the same sequence as shown in FIG. 2, but without the need to execute any accessing via the network. Hence, although the time required to perform path name resolution will be somewhat greater than for the case of the Type 1 (SPNT cache) operation, Type 2 operation provides the same advantages of predictability of file access times together with improved system reliability (since path name resolution can be achieved even if one of the nodes having a directory is a component of the path name is temporarily inoperative), and also provides substantially improved performance.

In the case of Type 2 operation, each replicated directory can consist of the root directory of the node from which it is replicated, or a subdirectory. Each directory of the distributed system is identified as being either an original or a replicated directory.

FIG. 5 shows a suitable format for each of the directories of a distributed system utilizing the Type 2 path name resolution operation of the present invention. As shown, the directory is divided basically into a status information area and a name mapping information area. The status information area consists of three fields, i.e.:

a "Replicated directory (Yes/No)" field 201 which contains information indicating whether or not the directory is a replicated directory;

a reference counter field 201 which serves a similar purpose to the reference counter which is used in each entry of an SPNT cache in Type 1 operation as described hereinabove; and a field 202 which contains other status information for the directory.

The name mapping information area contains a table of entries, each entry consisting of a field for a component name and a field for object location information. The object location information field can be of the form shown in FIG. 4B, described above. As described hereinabove, each component name may be the name of a file or of a directory.

It will be apparent that in some cases it will be possible for the system to use some of the replicated directories at a node for partially resolving a path name even if no user has specified Type 2 operation for that path name, i.e. if some of the components of the path name are common to a path name for which Type 2 operation has been previously specified.

Thus, when a user inputs an access command at a node, specifying a path name (without specifying Type 1, Type 2 or Type 3) the system would first refer to the SPNT cache to determine if the path name is registered there, and if so, execute Type 1 path name resolution. If not, the system would resolve the successive elements of the path name, either locally or by accessing the network, checking before each step to determine whether or not the next stage in the resolution procedure can utilize a directory which has been locally replicated, to thereby minimize the number of network accesses that are required.

The basic advantages obtained by providing a choice of Type 1, Type 2 and Type 3 modes of path name resolution by the method of the present invention can be summarized as follows. The respective performance categories "super", "good" and "unconcerned" could be applied to the Type 1, Type 2 and Type 3 operation. If a user of the distributed system finds that a certain file is being accessed very frequently, then the user can specify that Type 1 path name resolution will be executed for that file (i.e. specifying "super" access performance). Alternatively, a user may find that he/she is accessing a file moderately frequently, in which case Type 1 operation can be specified for that file (i.e. for "good" access performance). If, as is often the case, a user finds that a file is no longer being frequently accessed, i.e. the user has become unconcerned about the access performance for that file, and the user has previously specified Type 1 or Type 2 path name resolution for the file, then the user can change the path name resolution operation for the file to Type 3. When that is done, the reference counter of the corresponding entry in the SPNT cache is decremented by 1 (if the user specifies a change from Type 1 to Type 3 operation), or (if a change from Type 2 to Type 3 operation is specified) each of the reference counters of the respective files which have been replicated at the user's node in order to implement Type 2 operation for that file is decremented by 1. Each user makes such changes between Type 1, Type 2 and Type 3 operation for a file completely independently and without knowledge of any path name resolution mode changes which have been made for that file by any other user of the same node. In spite of that, the method of the invention ensures that:

(a) Each user can be certain that, after he/she specifies Type 1 or Type 2 operation for a file, that type of path name resolution will continue to be applied for the file, until the user specifies a change in the path name resolution type, and there is no danger that any change in the type will occur as a result of automatic replacement operations performed by a system management program; and (c) entries for files for which users do not require Type 1 will not be left remaining unnecessarily in the SPNT cache, and replicated directories which are not required for Type 2 operation by any user will not be left stored unnecessarily on disk.

Thus with the method of the present invention, if for example two users of a node in the distributed system, working mutually independently, should each specify that Type 1 path name resolution operation is to be implemented for a particular file, then instead of creating two separate entries for that file in the SPNT cache, the reference counter of the SPNT cache will be incremented by 1 as a result of the second user inputting a command specifying Type 1 operation for the file.

It can thus be understood that the value of the reference counter of an entry in the SPNT cache provides a measure of the frequency with which the corresponding file is being accessed by users of that node, i.e. indicates the number of users who require maximum access performance for that file. If the reference counter of an entry in the SPNT cache is successively decremented to become zero, so that the entry is deleted from the cache, then that signifies that none of the users of that node requires high access performance for the file any longer.

The method of the invention will be described in the following with reference to specific examples of commands and processing flows for implementing the method. Firstly, a system command (i.e. a command directed to the operating system program) which can be inputted at a node by a user for specifying that the Type 1 or Type 2 mode of path name resolution is to be executed thereafter for a particular file, will be assumed to have the form:

Set_name_resolution_perf (host_id, pathname, type)

A system command which can be inputted for specifying that the path name resolution operation is to be changed will be assumed to have the form:

Change_name_resolution_perf (host_id, path_name, old_type, new_type)

Such commands will be referred to in the following as the interface commands. In the above interface commands, "host_id" specifies the node identifier for the node from where the path name specified by "path_name" begins, (i.e. in general the node which is being used by the user who generates the input command). In the "Set_name_resolution_perf (host_id, pathname, type)" interface command, "type" specifies either Type 1 or Type 2 path name resolution operation, for resolution of the path name specified by "path_name".

In the "Change_name_resolution_perf (host_id, old_type, new_type)" command, "old_type" specifies the path name resolution type from which a change is to be made, for the path name specified by "path_name" (which begins from the node specified by "host_id"), while "new_type" specifies the path name resolution type to which the change is to be made.

Figure 6:
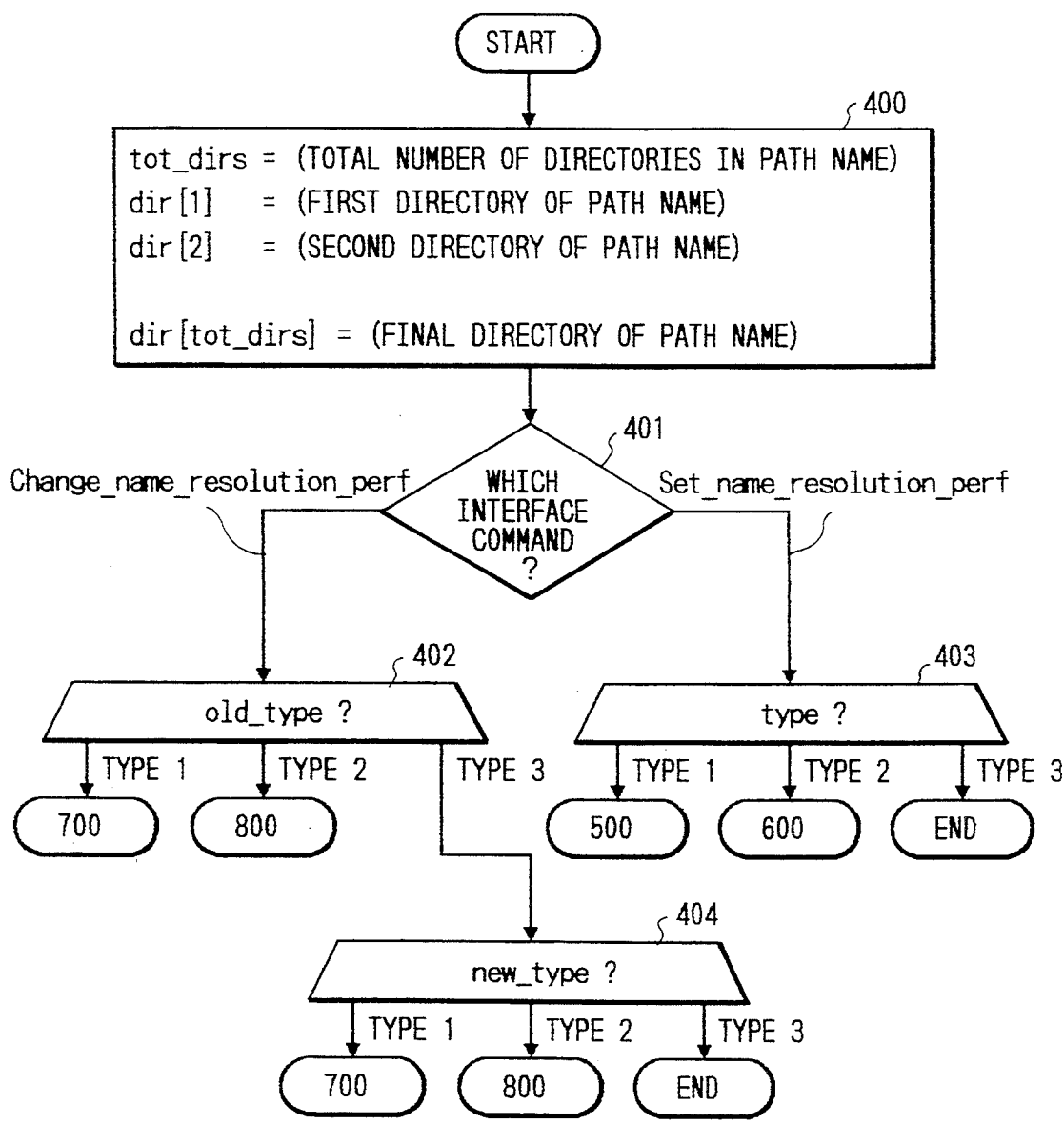
FIG. 6 is a flow diagram of processing which is executed in response to predetermined interface commands, for setting or changing a mode of path length resolution, with the preferred embodiment of the present invention.

An embodiment of the method of the present invention, utilizing the above two interface commands will be described referring to the flow diagrams of FIGS. 6 to 10. Referring first to FIG. 6, this shows the processing flow which occurs at a node in the distributed system when a user inputs one of the two interface commands described above, to specify setting or changing the mode of path name resolution to be used with a particular file. For simplicity, the node which is specified in such an interface command by "host_id" will be referred to as the local node, and its disk as the local disk. The system first prepares a directory name array 400. In that array, "tot_directories" specifies the total number of directories which must be successively searched to resolve the path name for the file. The remainder of the array consists of a table in which each entry relates one of the directories of the path name to one of a sequence of directory numbers, indicated as [1], [2] etc. The first directory is identified as dir [1], which is the root directory of the path name, while the remaining directories of the path name are sequentially identified as dir [2], . . . , with the final directory of the path name being identified in the array as "dir(tot_dirs)".

Next, in step 401, a decision is made as to which of the two input interface commands has been supplied to the system. If this was the "Set_name_resolution_perf (host_id, pathname, type)" command, then processing goes to step 403, while if the command was "Change_name_resolution_perf (host_id, old_type, new_type)" then processing goes to step 402. In step 403, a decision is made as to which of the three possible modes of path name resolution has been specified. If Type 1 has been specified, then a flow sequence 500 (described hereinafter) is executed, while if Type 2 has been specified, then a flow sequence 600 (described hereinafter) is executed, and if Type 3 has been specified, the processing sequence is ended.

In step 402 a decision is made as to the mode of path name resolution from which a change has been specified. If the change is to be from Type 1, then a flow sequence 700 (described hereinafter) is executed, while if the change is to be from Type 2, then a flow sequence 800 (described hereinafter) is executed, while if Type 3 has been specified, the processing moves to a decision step 404. In step 404, a decision is made as to the new mode of path name resolution to which a change is to be made. If this is Type 1, then the flow sequence 700 is executed, while if the change is to be from Type 2, then the flow sequence 800 is executed, while if Type 3 has been specified, the processing flow is ended.

Figure 7:
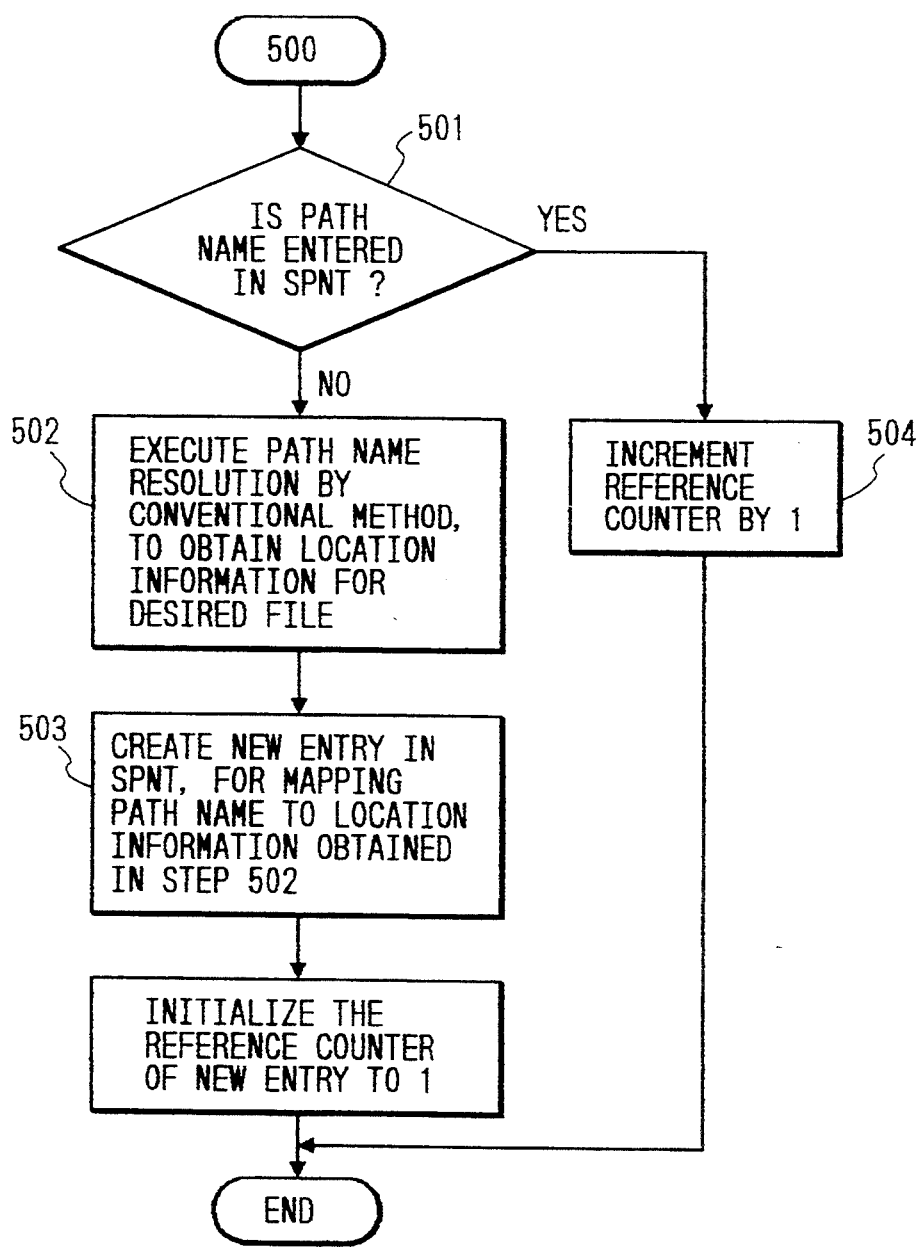
FIG. 7 is a flow diagram of processing which is executed to set the Type 1 mode of path name resolution with the preferred embodiment.

FIG. 7 is a flow diagram showing the processing flow 500 which is executed when the user has specified that Type 1 path name resolution is to be set for the specified path name. Firstly, a decision is made as to whether or not that path name is already registered in an entry of the SPNT cache. If so, then a step 504 is executed in which the reference counter of that entry in the SPNT cache is incremented by 1 (indicating that another user has specified that Type 1 operation is to be used for resolving that path name), and the processing flow then ends. However if it is found in step 501 that the path name is not registered in any entry of the SPNT cache, then a step 502 is executed, in which the conventional type of node-by-node directory accessing is performed to achieve path name resolution, and thereby obtain location information indicating where the desired file is resident in the distributed system. A step 503 is then executed, in which a new entry is created in the SPNT cache, with that entry relating the specified path name to the file location information that has been obtained. The reference counter field of that entry is then initialized to the value 1, and processing ends.

Figure 8:
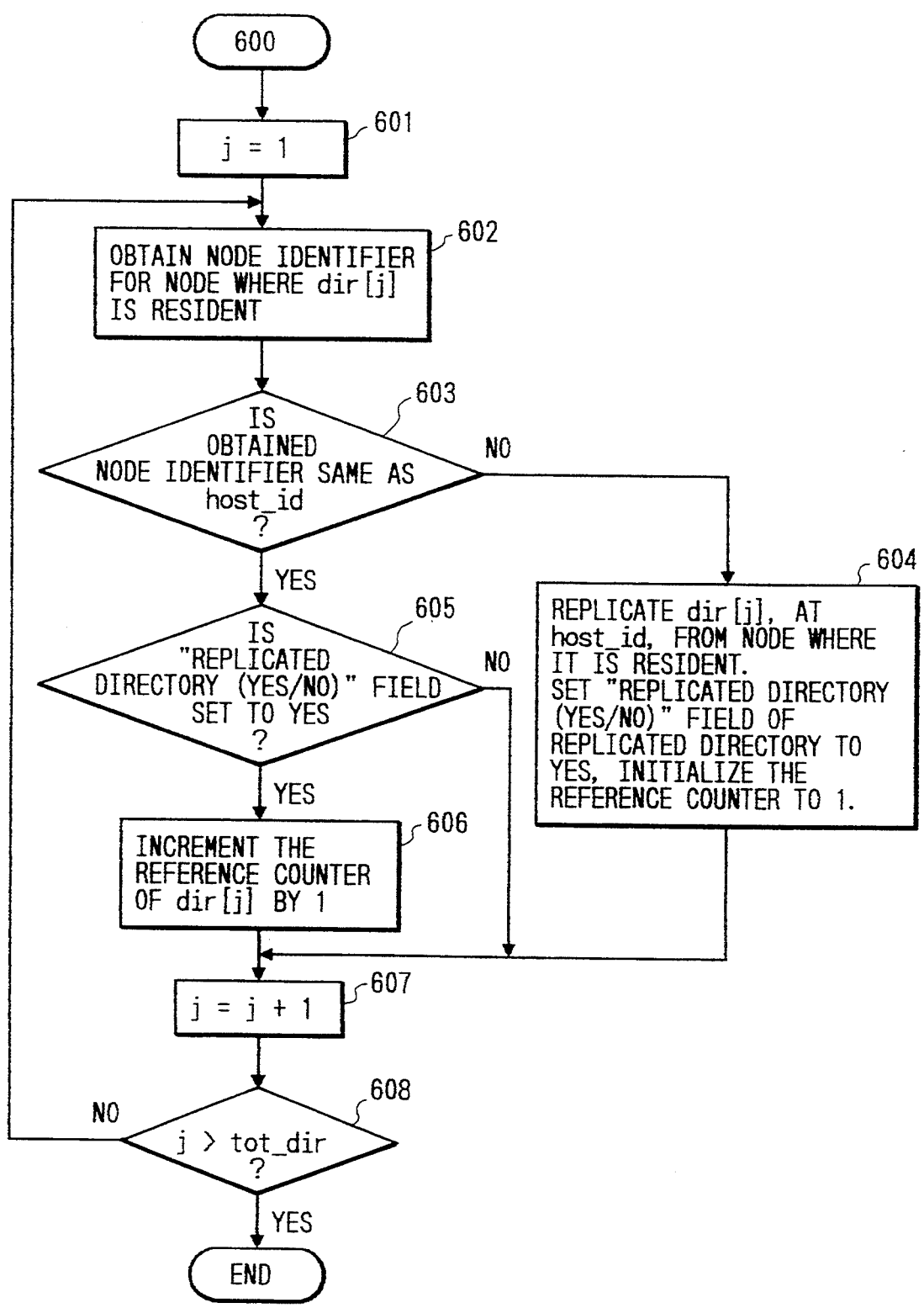
FIG. 8 is a flow diagram of processing which is executed to set the Type 2 mode of path name resolution with the preferred embodiment.

FIG. 8 is a flow diagram showing the processing flow 600 which is executed when the user has specified (as found in step 403 of FIG. 6) that Type 2 path name resolution is to be set for the specified path name. First, in step 601, the variable "j" which is used to number the directories of the path name, in the array 400 of FIG. 6 described above, is initialized to the value 1. Next in step 602, the node identifier for the node where the j-th directory of the path name (i.e. the directory listed in the array as "dir [j]") is resident is obtained, and in step 603 a decision is made as to whether or not that node identifier is identical to the node specified by "host_id" in the interface command. If a "no" decision is made, then step 604 is executed, in which the node where the j-th directory is resident is accessed via the system, and that directory is then replicated on the local disk, with the reference counter of that replicated directory being initialized to 1, and with the "replicated directory (YES/NO)" field of the directory being set to "YES".

However if it is found in step 603 that the j-th directory is already present on the local disk, then step 605 is executed in which a decision is made as to whether or not that directory is a replicated directory. If the directory is found to be a replicated directory, then a step 606 is executed, in which the reference counter of the directory is incremented by 1. Operation then proceeds to step 607, in which the directory counter variable j is incremented by 1. If it is found in step 605 that the directory is not replicated locally, then operation proceeds to step 607. After step 607, a decision is made as to in step 605 as to whether all of the directories of the directory array 400 have been processed. If so, processing is ended, and otherwise, operation returns to step 602, and processing for the next directory of the path name is executed.

Figure 9:
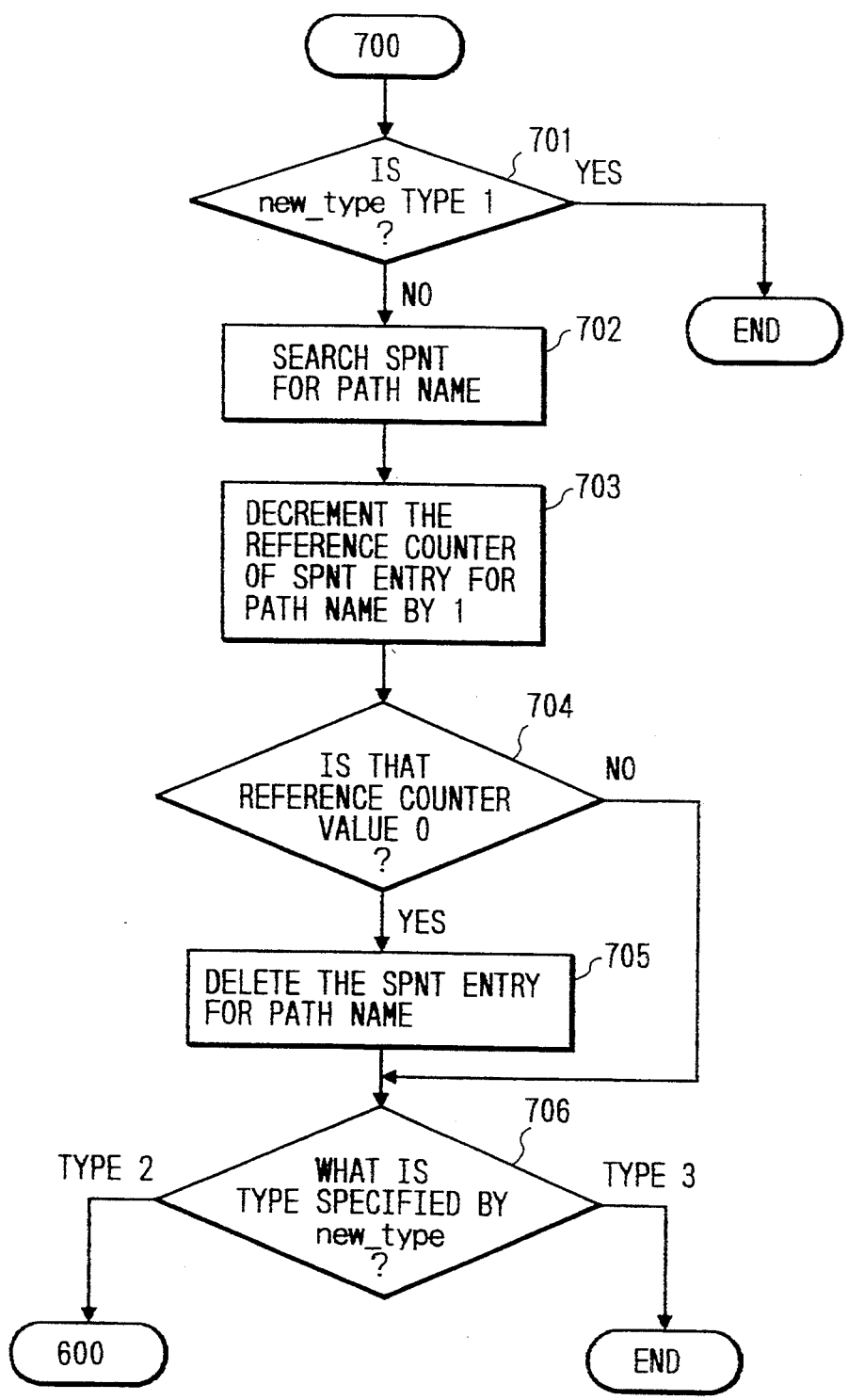
FIG. 9 is a flow diagram of processing which is executed to change from Type 1 mode of path name resolution to another mode, with the preferred embodiment.

FIG. 9 is a flow diagram showing the processing flow 700 which is executed when the user has specified (as found in step 404 of FIG. 6) that a change in the mode of path name resolution is to be performed, when Type 1 operation is currently set for the specified path name. First, in step 701, a decision is made as to whether or not the path name resolution is to be changed to Type 1. If so, since there is no actual change, processing is ended. If the new type is different from Type 1, then step 702 is executed, in which the SPNT cache is searched for the entry corresponding to the specified path name. The reference counter of that entry in the SPNT cache is then incremented by 1. Step 704 is then executed, in which a decision is made as to whether or not the reference counter of that entry in the SPNT cache has reached zero, and if not operation proceeds to step 706, whereas if the reference counter has reached zero, step 705 is executed in which the entry for the specified path name is deleted from the SPNT cache. Next, in step 706 a decision is made as to whether or not the change is to be made to Type 2 or Type 3 operation. If it is to Type 2, then operation proceeds to the flow sequence 600 described above, while if the change is to Type 3 then processing is ended.

Figure 10:
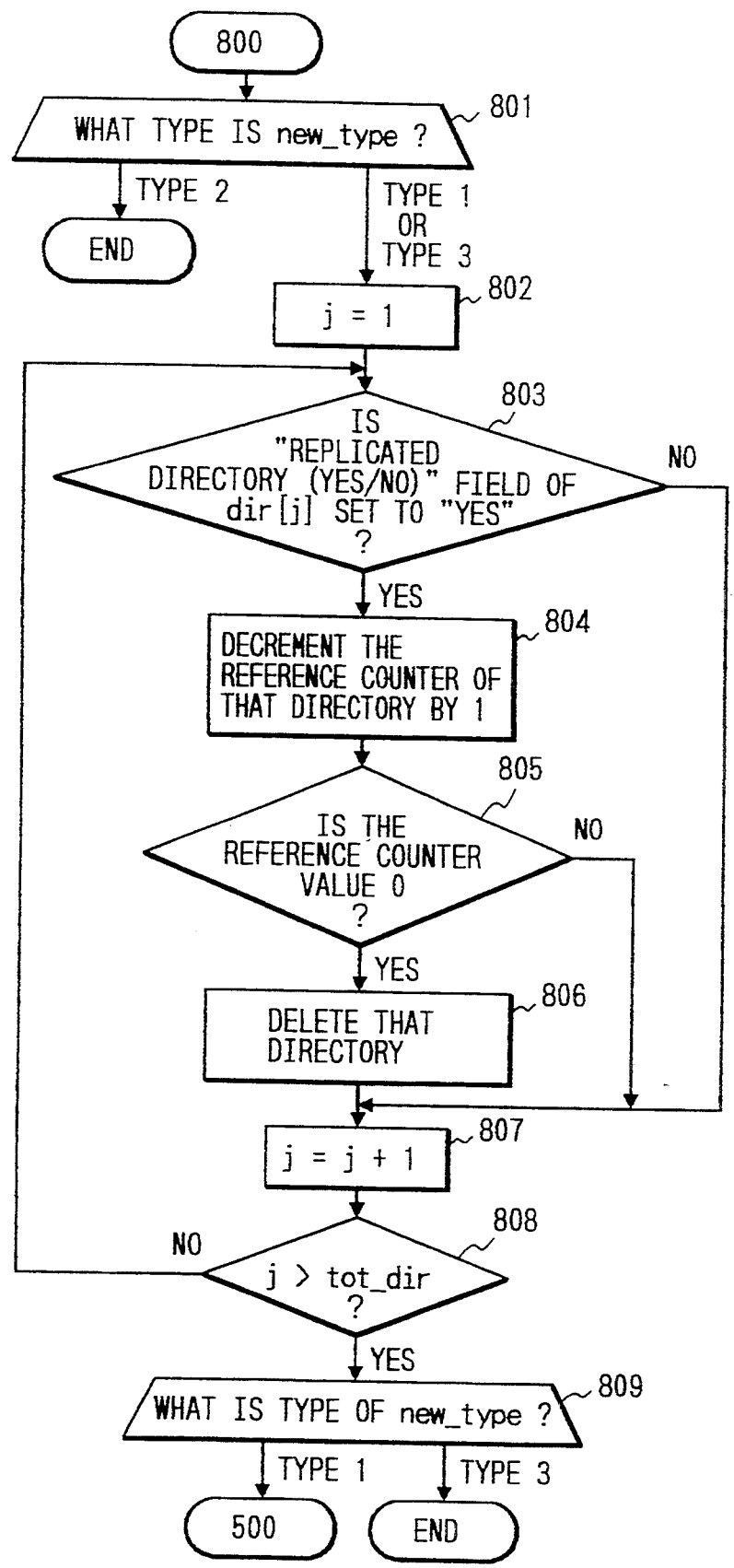
FIG. 10 is a flow diagram of processing which is executed to change from Type 2 mode of path name resolution to another mode, with the preferred embodiment.

FIG. 10 illustrates the processing sequence 800 which is executed when a change from Type 2 path name resolution is specified. First in step 801 a decision is made as to whether the path name resolution mode to which the change is to be made is Type 2. If so, since there will be no actual change, the processing is ended. If a change to Type 1 or Type 3 operation is specified, then in step 802 the count variable "j" for the directory array 400 is initialized to 1. Next in step 803 a decision is made as to whether or not the j-th directory of the path name is a replicated directory. If it is not, then processing proceeds to step 807, while if the directory is a replicated directory then step 804 is executed, in which the reference counter of that directory is decremented by 1. A decision is then made (step 805) as to whether the reference counter of that directory has reached zero. If not, step 807 is executed, while otherwise, the directory is deleted from the local disk. In step 807, the directory count variable j is incremented by 1, and then a check is made as to whether all of the directories of the path name have been processed. If "no" then processing returns to step 803, while if "yes" then step 809 is executed to judge whether the change is to be made to Type 1 or to Type 3 operation. If the change is to be to Type 1, then processing proceeds to the flow sequence 500 described above, while if the change is to be to Type 3 then the processing is ended.

With a distributed system utilizing the method of the present invention, when a user inputs a file access command at a node, then (assuming that the file is not named in the root directory of that node) the system will first search the SPNT cache to find if there is an entry corresponding to the path name which the user has specified for the file when inputting the file access command. If a corresponding entry is found, then immediate path name resolution is achieved. If no corresponding entry is found, the system successively searches each of the directories which is named in the path name, as illustrated for the conventional path name resolution method of FIG. 2. However in this case, if it is found that a directory is a replicated directory at that node, i.e. the client node, then the corresponding entry in that directory is accessed locally, with no need to access another node via the network. If any directory is not replicated locally, i.e. is resident at some other node, then that other node will be accessed via the network, and searched for the corresponding entry.

In the case of a path name for which a user of the local node has previously specified Type 2 operation of course, the entire path name resolution processing will be performed locally, with no network access being required.

The operation of the above embodiment of the method of the present invention will be illustrated with reference to a specific example. It will be assumed that the method is applied to a distributed system having six nodes, identified as nodes 1, 2, 3, 4, 5 and 6 respectively, and that a file having the path name "/a/b/c/d/e" is to be accessed from node 1 of the system, i.e. a file having file name "e". For simplicity of description, it will be assumed that the only location information required for each directory and for the file e is the node identifier for the node where that directory or file is resident.

The successive directories of the path name are the root directory "/" which is resident at node 1, directory "/a" which is resident at node 3, directory "/a/b" which is resident at node 5, directory "/a/b/c" which is resident at node 2, and directory "/a/b/c/d" which is resident at node 4. The file e is assumed to be resident at node 4.

FIG. 11A illustrates the status of the directories which appear in the specified path name, indicated the respective nodes where the directories are resident, and the conditions of the "Replicated file (YES/NO)" field and the reference counter field of each of the directories in the path name. As shown, each "Replicated file (YES/NO)" field is initially in the "NO" state, i.e. each of the directories shown exists only as a resident (i.e. original) file. FIG. 11B illustrates the status of the SPNT cache of node 1, showing that it initially contains no entries.

It will be assumed that four different users of node 1 successively set respective modes of path name resolution operation for the path name "/a/b/c/d/e", and that subsequently each user designate a return to Type 3 operation, i.e. each user subsequently finds that he/she has become unconcerned about access performance concerning the file e. The sequence of inputting interface commands by the users will be assumed to be as follows:

(1) Set_name_resolution_perf (host_1, /a/b/c/d/e, type_1)
(2) Set_name_resolution_perf (host_1, /a/b/c/d/e, type_2)
(3) Set_name_resolution_perf (host_1, /a/b/c/d/e, type_1)
(4) Set_name_resolution_perf (host_1, /a/b/c/d/e, type_2)
(5) Change_name_resolution_perf (host_1, /a/b/c/d/e, type_2, type_3)
(6) Change_name_resolution_perf (host_1, /a/b/c/d/e, type_2, type_3)
(7) Change_name_resolution_perf (host_1, /a/b/c/d/e, type_1, type_3)
(8) Change_name_resolution_perf (host_1, /a/b/c/d/e, type_1, type_3)

FIGS. 12A, 12B illustrate the results of execution of the interface command (1) above, which specifies that Type 1 operation is to be set for resolution of the path name "/a/b/c/d/e" from the node 1. In that case the processing sequence of FIG. 7 above will be executed. As shown in FIGS. 12A, 12B, the result of executing that interface command is to set an entry for the path name "/a/b/c/d/e" in the SPNT cache, with the reference counter of that entry initialized to 1.

FIGS. 13A, 13B illustrate the results of then executing the interface command (2) above, which specifies that Type 2 operation is to be set for resolution of the path name "/a/b/c/d/e" from the node 1. (It should be noted that in this case, although one user has previously specified Type 1 operation for that path name, while a second user, working independently of the first user, has specified Type 2 operation, there is no change in the entry for that path name in the SPNT cache. Thus, the first user will still obtain the known high speed of accessing file e which he/she has specified, irrespective of the actions of any other user in specifying a different mode of path name resolution for that file). In this case, the processing sequence of FIG. 7 above will be executed. As shown in FIGS. 13A, 13B, the result of executing that interface command is to replicate each of the directories '/a', '/a/b', '/a/b/c/', and '/a/b/c/d' on the disk of node 1, with the "Replicated file (YES/NO)" field of each of these directories in the 'YES' state and with the reference counter of each directory initialized to 1.

FIGS. 14A, 14B illustrate the results of then executing the interface command (3) above, which specifies that Type 1 operation is to be again set for resolution of the path name "/a/b/c/d/e" from the node 1 (i.e. signifying that a second user of node 1 requires maximum accessing speed for file e). In that case, since an entry for the specified path name already exists in the SPNT cache, the processing sequence of FIG. 7 above will be entered, with step 504 being executed, so that the SPNT cache entry for path name "/a/b/c/d/e" will be incremented by 1.

FIGS. 15A, 15B illustrate the results of then executing the interface command (4) above, which specifies that Type 2 operation is to be again set for resolution of the path name "/a/b/c/d/e" from the node 1 (i.e. signifying that another user of node 1 requires a moderately high speed of accessing the file e). In that case, the processing sequence of FIG. 7 will be entered, however since all of the directories of the specified path name already are stored on disk at node 1, either as original or replicated directories, the only action taken is to increment the reference counter of each of the replicated directories by 1, as shown.

FIGS. 16A, 16B illustrate the results of then executing the interface command (5) above, which specifies that the path name resolution mode is to be changed from Type 2 to Type 3. This indicates that one of the users who previously required moderately high access speed for file e no longer expects to be frequently using that file. In this case, the processing will pass through the sequence shown in FIG. 10, i.e. step 804 in FIG. 10 will be successively executed for each replicated directory, so that 1 is subtracted from the reference counter of each of the replicated directories '/a', '/a/b', '/a/b/c/', and '/a/b/c/d'.

FIGS. 17A, 17B illustrate the results of then executing the interface command (6) above, which again specifies that the path name resolution mode for the path name "/a/b/c/d/e" is to be changed from Type 2 to Type 3. This indicates that the second user who previously required moderately high access speed for file e has become unconcerned about that access speed. As a result, 1 will again be subtracted from the reference counter of each of the replicated directories '/a', '/a/b', '/a/b/c/', and '/a/b/c/d', so that each reference counter will be reset to zero. These replicated directories will then be deleted from the disk of node 1.

FIGS. 18A, 18B illustrate the results of then executing the interface command (7) above, which specifies that the path name resolution mode is to be changed from Type 1 to Type 3. This indicates that one of the users who previously required the maximum speed of accessing file e is no longer concerned about that access speed. In this case, the processing will pass through the sequence shown in FIG. 9, i.e. step 703 in FIG. 10 will be executed to thereby decrement the reference counter of the SPNT cache by 1.

FIGS. 19A, 19B illustrate the results of then executing the interface command (8) above, which again specifies that the path name resolution mode for the path name "/a/b/c/d/e" is to be changed from Type 1 to Type 3. This indicates that the second user who previously required maximum access speed for file e has become unconcerned about that access speed. As a result, 1 will again be subtracted from the reference counter of the entry for path name "/a/b/c/d/e" in the SPNT cache, resetting that counter to zero. The corresponding entry in the SPNT cache will then be deleted.

It can thus be understood that in the above example, in which four users of node 1 of the distributed system (working mutually independently) each supply commands for setting and changing the mode of path name resolution for the same file, the result of inputting the sequence of interface commands (1) to (8) above is to leave the condition of the system unchanged from its initial condition, i.e. no disk capacity or main memory capacity of node 1 is left in a condition of being used to store replicated directories or name cache entries which are no longer actually required by any user. This has been achieved by the actions of the users alone, in inputting the respective interface commands for designating the mode of path name resolution which each user desires for the specified file, without using a system resource management program to deal with the deletion of cache entries or replicated directories.

It can hence be understood that the method of the present invention enables each user of a distributed system to specify, for any file in the system, a path name resolution mode whereby a fixed speed of accessing the file is ensured.

In addition, the embodiment of the invention described hereinabove enables each user to select either of two different modes of path name resolution which result in respectively different degrees of (fixed) file access speed, with one of these modes utilizing replicated directories which are stored locally. Hence, a user who requires only a moderate (but consistent) degree of access speed for a particular file can specify a path name resolution mode which does not result in main memory capacity being utilized for a name cache entry corresponding to that file.

In the above description, it has been assumed that each user of the distributed system will conscientiously change the path name resolution mode (Type 1 or Type 2) which he/she has previously specified for a file back to the conventional (Type 3) mode, when the user finds that the file will no longer be frequently utilized. In the embodiment described above, a common SPNT cache is provided in each node, for all users of the node. However in actual practice, it may be necessary to take measures against user carelessness, to prevent unnecessary use of main memory capacity for SPNT cache entries which are no longer actually required. That could be achieved for example by modifying the embodiment described above, such that each user of a node is allocated an individual SPNT cache region in main memory of that node. When the maximum number of entries in a user's cache is exceeded, an indication could be provided by the system to the user, who would then have to supply interface commands to specify that the path name resolution mode for one or more of the entries in his/her cache is to be changed from Type 1 to Type 2 or to Type 3.

Furthermore, although the method of the invention has been described above with reference to an embodiment whereby the Type 1, Type 2 or Type 3 modes of path name resolution can be selected, it would be possible to envisage an embodiment whereby only the Type 1 or Type 3 modes can be selected, or an embodiment whereby only the Type 2 or Type 3 modes can be selected.

It will be clear that various other modifications to the embodiment described above could also be envisaged, which would fall within the scope claimed for the present invention, so that the above description should be understood in a descriptive and not in a limiting sense.

What is claimed is:

1. A path name resolution method for a network of data processing systems, each of said data processing systems having main memory means with high access speed and secondary memory means with lower access speed than said main memory means, the method comprising:

at a first system of said data processing systems, responding to inputting of a first predetermined command which specifies a path name of a file that is resident at a second system of said data processing systems and which specifies a high-speed mode of path name resolution for said path name, by accessing and searching each of successive directories which are identified in said path name, to obtain file location information for said file, and creating an entry in a cache within said main memory means, said cache entry comprising a name of said file, said file location information, and a counter which is initialized to a fixed amount;

responding to a subsequent inputting of said first predetermined command specifying said path name, by incrementing said counter by said fixed amount;

responding to inputting of a second predetermined command which specifies said path name and which specifies a mode of resolving said path name that does not utilize said cache, by decrementing said counter value by said fixed amount; and responding to a condition whereby said counter value becomes zero, by deleting said cache entry.

2. A path name resolution method for a network of data processing systems, each of said data processing systems having main memory means with high access speed and secondary memory means with lower access speed than said main memory means, the method comprising:

at a first system of said data processing systems, responding to inputting of a first predetermined command which specifies a path name of a file that is resident at a second system of said data processing systems and which specifies a moderate-speed mode of resolution of said path name, by replicating in said secondary memory means of said first system, as a replicated directory, each of a set of directories which are identified in said path name and are not original directories of said first system;

providing, in each of said replicated directories, a counter which is initialized to a fixed amount;

responding to a subsequent inputting of said first predetermined command specifying said path name, by incrementing each of said counters by said fixed amount;

responding to inputting of a second predetermined command which which specifies said path name and which specifies a mode of resolving said path name other than said moderate-speed mode, by decrementing each of said counter values by said fixed amount; and responding to a condition whereby any of said counter values becomes zero, by deleting a corresponding one of said replicated directories.

3. A path name resolution method for a network of data processing systems, each of said data processing systems having main memory means with high access speed and secondary memory means with lower access speed than said main memory means, the method comprising:

at a first system of said data processing systems, responding to inputting of a first predetermined command which specifies a first path name, of a file that is resident at a second system of said data processing systems, and which specifies a high-speed mode of resolution for said first path name, by accessing and searching each of successive directories which are identified in said first path name, to obtain file location information for said file, and creating an entry in a cache within said main memory means, said cache entry comprising a name of said file, said file location information, and a first counter which is initialized to a fixed amount;

responding to a subsequent inputting of said first predetermined command specifying said first path name, by incrementing said first counter by said fixed amount;

responding to inputting of a second predetermined command which specifies said first path name and which specifies a mode of resolving said first path name other than said high-speed mode, by decrementing said first counter value by said fixed amount; and responding to a condition whereby said first counter value becomes zero, by deleting said cache entry;

responding to inputting of a third predetermined command which specifies a second path name, of a file that is resident at one of said data processing systems other than said first system, and which specifies a moderate-speed mode of path name resolution for said path name, by replicating in said secondary memory means of said first system, as respective replicated directories, a set of directories which are identified in said second path name and which are not original directories of said first system;

providing in each of said replicated directories a second counter, which is initialized to a fixed amount;

responding to a subsequent inputting of said third predetermined command specifying said second path name, by incrementing each of said second counters by said fixed amount;

responding to inputting of a fourth predetermined command which specifies said second path name and which specifies a mode of resolving said second path name other than said moderate-speed mode, by decrementing each of said second counter values by said fixed amount; and responding to a condition whereby any of said second counter values becomes zero, by deleting a corresponding one of said replicated directories.

\* \* \* \* \*